(12) United States Patent
Lin

(10) Patent No.: US 6,905,102 B2
(45) Date of Patent: Jun. 14, 2005

(54) KEYBOARD SUPPORT BRACKET STRUCTURE

(75) Inventor: Sheng-Hsiung Lin, Shindian (TW)

(73) Assignee: Puu Rong Industries Co., Ltd., Taipei ( * ) Notice: Subject to any disclaimer, the term of this patent is extended or adjusted under 35 U.S.C. 154(b) by 117 days.

(21) Appl. No.: 10/609,558

(22) Filed: Jul. 1, 2003

(65) Prior Publication Data

US 2005/0001121 A1    Jan. 6, 2005

(51) Int. Cl.$^7$ .............................................. E04G 3/00
(52) U.S. Cl. ........................... 248/285.1; 248/281.11; 248/118.3; 248/284.1; 248/278.1; 108/141; 108/146
(58) Field of Search .................... 248/294.1, 285.1, 248/278.1, 918, 297.1, 280.11, 284.1, 291.13, 248/281.11, 118.3, 274.1, 276.1, 286.1; 108/6, 108/7, 138, 139, 141, 146; 312/27, 28

(56) References Cited

U.S. PATENT DOCUMENTS

| | | | |
|---|---|---|---|
| 4,616,798 A | | 10/1986 | Smeenge et al. |
| 4,706,919 A | * | 11/1987 | Soberalski et al. ..... 248/281.11 |
| 5,037,054 A | * | 8/1991 | McConnell .............. 248/284.1 |
| 5,145,136 A | * | 9/1992 | McConnell .............. 248/284.1 |
| 5,257,767 A | | 11/1993 | McConnell |
| 5,901,933 A | * | 5/1999 | Lin ......................... 248/285.1 |
| 5,924,664 A | | 7/1999 | Mileos et al. |
| 5,924,666 A | * | 7/1999 | Liu .......................... 248/286.1 |
| 6,021,985 A | * | 2/2000 | Hahn ...................... 248/286.1 |
| 6,027,090 A | * | 2/2000 | Liu ........................ 248/281.11 |
| 6,116,557 A | * | 9/2000 | Choy et al. .............. 248/286.1 |
| 6,135,404 A | * | 10/2000 | Wisniewski et al. ... 248/281.11 |
| 6,186,460 B1 | * | 2/2001 | Lin .......................... 248/284.1 |
| 6,199,809 B1 | * | 3/2001 | Hung ...................... 248/284.1 |
| 6,257,538 B1 | * | 7/2001 | Pangborn et al. ........ 248/284.1 |
| 6,270,047 B1 | * | 8/2001 | Hudson ................... 248/284.1 |
| 6,279,859 B2 | * | 8/2001 | West et al. ................. 248/118 |
| 6,398,176 B1 | * | 6/2002 | Liu .......................... 248/284.1 |
| 6,409,127 B1 | * | 6/2002 | VanderHeide et al. ...... 248/118 |
| 6,450,467 B2 | * | 9/2002 | Timm ...................... 248/284.1 |
| 6,533,229 B1 | * | 3/2003 | Hung ...................... 248/286.1 |
| 6,565,056 B2 | * | 5/2003 | Lin .......................... 248/284.1 |

* cited by examiner

Primary Examiner—Kimberly T. Wood
(74) Attorney, Agent, or Firm—Birch, Stewart, Kolasch & Birch, LLP

(57) ABSTRACT

An angularly adjustable keyboard support bracket includes a mounting rack attached to a desktop, a movable arm coupled with the mounting rack through a pin, and a bracing rack coupled with another end of the movable arm through another pin for holding a tray. A rotary mechanism is located between the bracing rack and the tray to enable the tray to swivel to the left side and the right side for a selected angle relative to the bracing rack to provide users with a desired operating angle.

12 Claims, 18 Drawing Sheets

KEYBOARD SUPPORT BRACKET STRUCTURE

FIELD OF THE INVENTION

The present invention relates to a keyboard support bracket structure and particularly to a keyboard support bracket for holding a keyboard and that is movable horizontally and vertically to suit user's operating position.

BACKGROUND OF THE INVENTION

Computer has been widely used by individuals and companies nowadays. When the computer is in use, in order to avoid the keyboard from occupying too much desktop space and take into account of ergonomics to prevent users from hand injury caused by taking the same posture for a long period of time during operation, a keyboard support bracket has been developed to suit user's posture and hand position, and to make adjustment endlessly.

There are plenty of keyboard support brackets proposed in the prior art. For instance, U.S. Pat. No. 4,616,798 discloses an adjustable support for CRT keyboard. It has a bracket holding a keyboard and connecting to a parallelogram linkage located underside a desk. Because the parallelogram linkage is fastened to the lower side of the keyboard support bracket, the space between the bottom and the floor is limited. Leg room is not adequate to accommodate leg movements of users.

U.S. Pat. No. 5,257,767 discloses an adjustable support mechanism for a keyboard platform. While it addresses the shortcomings of the aforesaid patent and uses a non-parallelogram linkage to increase the leg room, its linkage mechanism is still fastened to the lower side of the keyboard support bracket, and the increased space is limited.

U.S. Pat. No. 5,924,664 discloses a keyboard support mechanism which tries to improve the two patents mentioned above. It consists of a mounting bracket, a mounting bracket support in combination with a swivel bracket, a shelf bracket, an upper arm at least one side arm and at least one stopping means. It generates a linkage motion through four pivot points, and the side arm and the stopping means have corresponding connection concave surfaces to generate friction forces to produce locking and positioning effect. However it still has problems remained to be overcome, notably:

It still adopts a conventional parallelogram or non-parallelogram linkage with four pivot points linkages to pivotally connect to one another to achieve endless vertical movement. The side arm is extended to form an arched end to produce a friction force on a first side of the stopping means to achieve positioning. As the side arm and the stopping means are made of metal, in terms of applying forces easily and providing frictional forces required for latching, they cannot generate a desirable coordination during the movement. The metal also generates heat and noise under friction. The arched end tends to wear off after used for a long period of time.

In addition, according to ergonomics, when the keyboard is under operation, the forearm of users must be in parallel with the back of hands. To make the support bracket to support hands nicely, the support bracket also is preferably in parallel with the forearm. However, all the support brackets in the prior art has the side arm forming a constant angle relative to the floor (generally tilting upwards about 3 degrees, referring to U.S. Pat. No. 5,924,664, item 54). Based on user's perspective, the forearm inclines downwards gradually from the position adjacent to the desktop to the operation position. If the support bracket does not alter the angle, the support effect of the support bracket to the wrist and forearm diminishes gradually. As a result, it could cause injury to users when operating in such a posture for a long period of time.

SUMMARY OF THE INVENTION

Therefore the primary object of the invention is to resolve the aforesaid disadvantages and overcome the drawbacks of the prior art. The invention does not adopt conventional fixed pivotal connection for four points axles. Instead, one of the axles is connected movably. The fixed point connection relationship for friction is eliminated. Then other three fixed points axles may be moved endlessly. Thereby wearing of the related elements may be reduced and service life of the product may increase. Noise caused by movements can also be prevented. As there is no restriction of the friction force, the linkage mechanism of the invention enables user's hand to apply force easily. The keyboard support bracket also is more suitable for people to use. In addition, when the angle of the side arm of the invention increases when it is changed from closing to the highest position of the desktop to the lowest position, the included angle of the holding bracket relative to the desktop must decrease, namely, the support bracket inclines to a selected angle to suit user's forearm when the side arm is moved downwards. Therefore, user's forearm may have an effective support whatever operating positions user's forearm is taking. Thus it can better conform to ergonomics and reduce the risk of injury.

In order to achieve the foregoing object, the invention includes a mounting bracket fastening to a desktop, an upper arm pivotally engaged with the mounting bracket through a first axle, a side arm pivotally coupled on two sides of mounting bracket through a second axle, and a holding bracket pivotally engaged with the upper arm through a third axle and pivotally engaged with the side arm through a fourth axle. The fourth axle is movably connected to release the constrained position of the holding bracket, then the first, second and third axles may be moved to perform vertical adjustment endlessly. The keyboard support structure thus made uses a fewer number of elements and may be moved with less effort.

The foregoing, as well as additional objects, features and advantages of the invention will be more readily apparent from the following detailed description, which proceeds with reference to the accompanying drawings.

BRIEF DESCRIPTION OF THE DRAWINGS

FIGS. 3A through 3L are schematic views of the present invention in various adjustment conditions.

DETAILED DESCRIPTION OF THE PREFERRED EMBODIMENT

Figure 1:
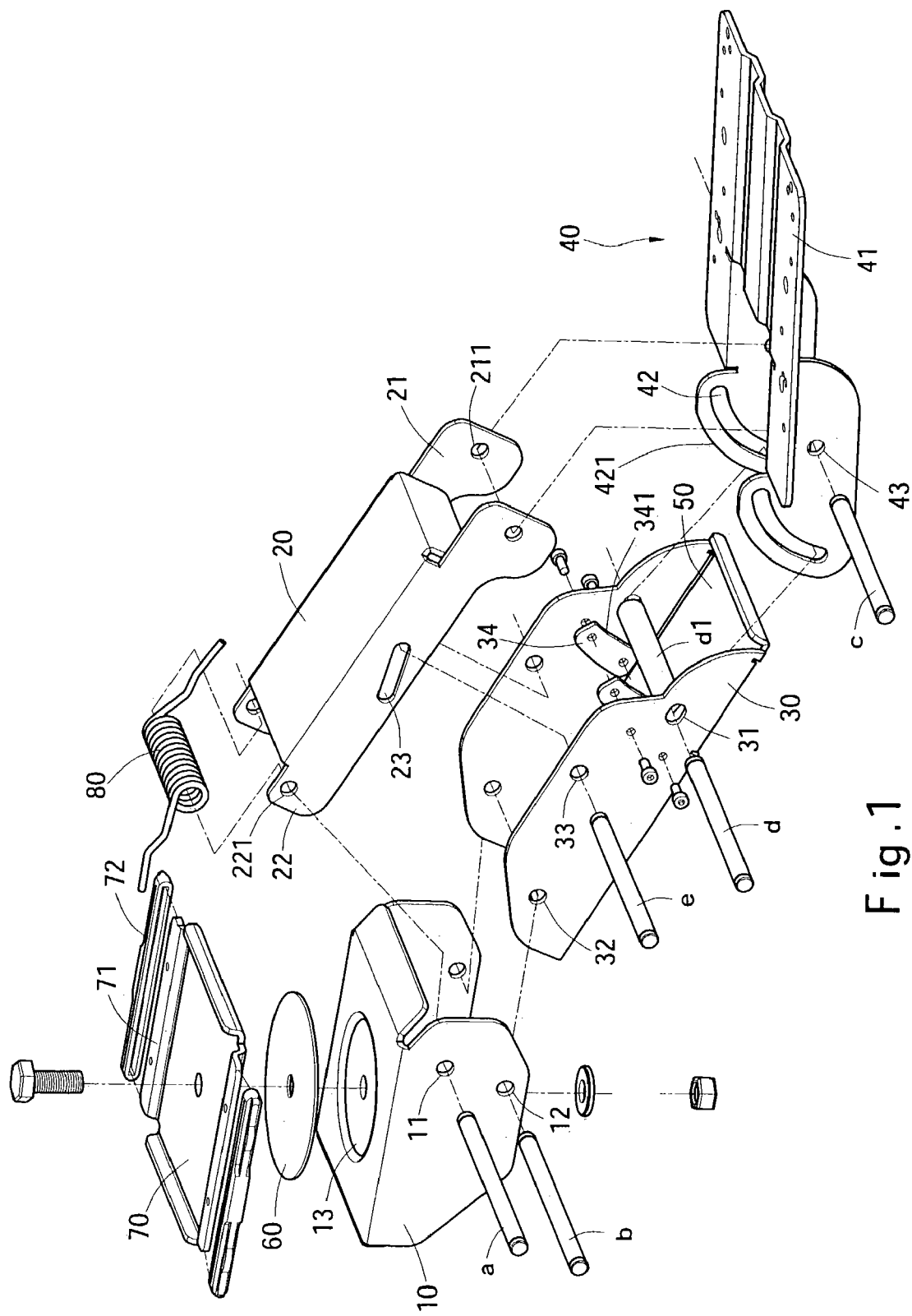
FIG. 1 is an exploded view of the present invention.
Figure 2:
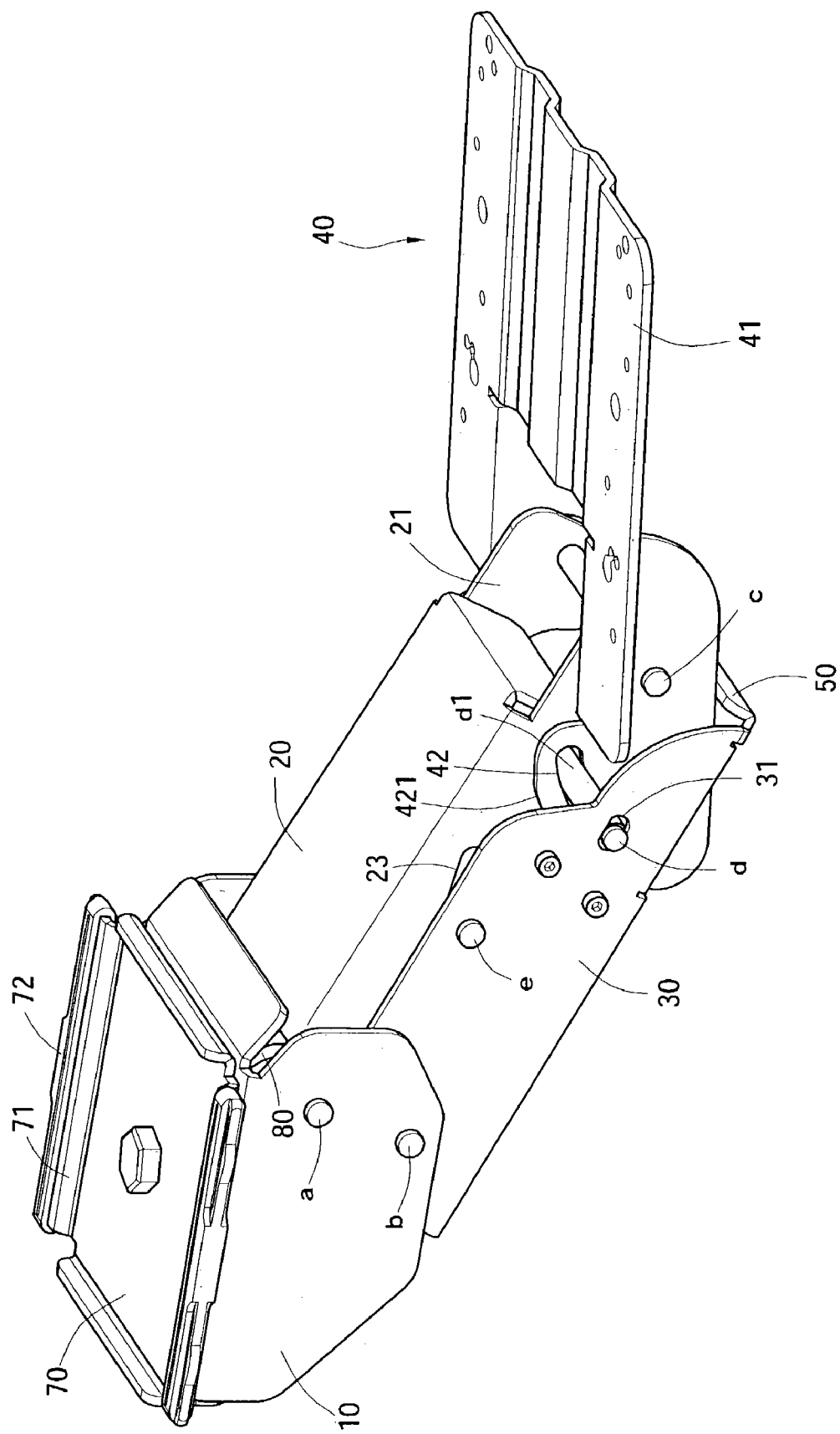
FIG. 2 is a perspective view of the present invention.

Please referring to FIGS. 1, 2, 3A and 5, the present invention is located under a desktop 101 and may be moved horizontally and vertically relative to the desktop 101 to a desired location for holding a keyboard (not shown in the drawings) at an operating position. The invention includes a mounting bracket 10 fastening to the desktop 101, an upper arm 20 pivotally engaged with the mounting bracket 10 through a first axle a which runs through pivot holes 11 and 221, a side arm 30 pivotally coupled on two sides of the mounting bracket 10 through a second axle b which runs through pivot holes 12 and 32, and a holding bracket 40 pivotally engaged with the upper arm 20 through a third axle c and pivotally engaged with the side arm 30 through a fourth axle d that run through pivot holes 211 and 43. The first axle a is coupled with an elastic restoring element 80 which provides a biased pressure upwards.

The pivot holes 221 and 211 of the upper arm 20 are formed respectively on a front flap 21 and a rear flap 22 that are extended from the front end and the rear end of the upper arm 20 to couple with the first axle a and the third axle c. The front and rear flaps 21 and 22 aim at providing a selected interval between the upper arm 20 and the mounting bracket 10 and the holding bracket 40 to facilitate vertical adjustment and thread the cables of the keyboard.

The desktop 101 has a lower side fastening to a track plate 90. The mounting bracket 10 has a sliding track dock 70 fastened thereon. The sliding track dock 70 has two side flanges 71 each fastens to a sliding rail 72 which may move horizontally on the track plate 90. The mounting bracket 10 further has a swivel zone 13 which holds a rotary disk 60 between the rotary zone 13 and the sliding track dock 70.

The first, second and third axles a, b and c are pivotally engaged at fixed locations to form a linkage movement. The side arm 30 has an adjusting hole 31 formed on the pivotal connection location for the fourth axle d. The adjusting hole 31 has a transverse width greater than the outer diameter of the fourth axle d. The fourth axle d further is coupled with a sleeve d1 in the side arm 30 that has an outer diameter greater than the fourth axle d and the height of the adjusting hole 31. Inside the side arm 30, there is a brake element 34 which has a brake side 341 facing the holding bracket 40. The holding bracket 40 has an arched displacement slot 42 corresponding to the adjusting hole 31. The outer side of the displacement slot 42 forms a harness side 421 corresponding to and capable of in contact with the brake side 341 of the brake element 34.

In addition, the middle portion of the upper arm 20 has a transverse slot 23 relative to the vertical displacement. The transverse slot 23 is coupled with a fifth axle e which runs through pivot holes 33 formed on the side arm 30 and the upper arm 20. The bottom of the two side arms 30 has a lower arm 50. The fifth axle e aims at aiding the movement of the upper arm 20 and the side arm 30 to prevent them from skewing or tilting during movement. It also can increase friction force and overall strength of the product.

Figure 3A:
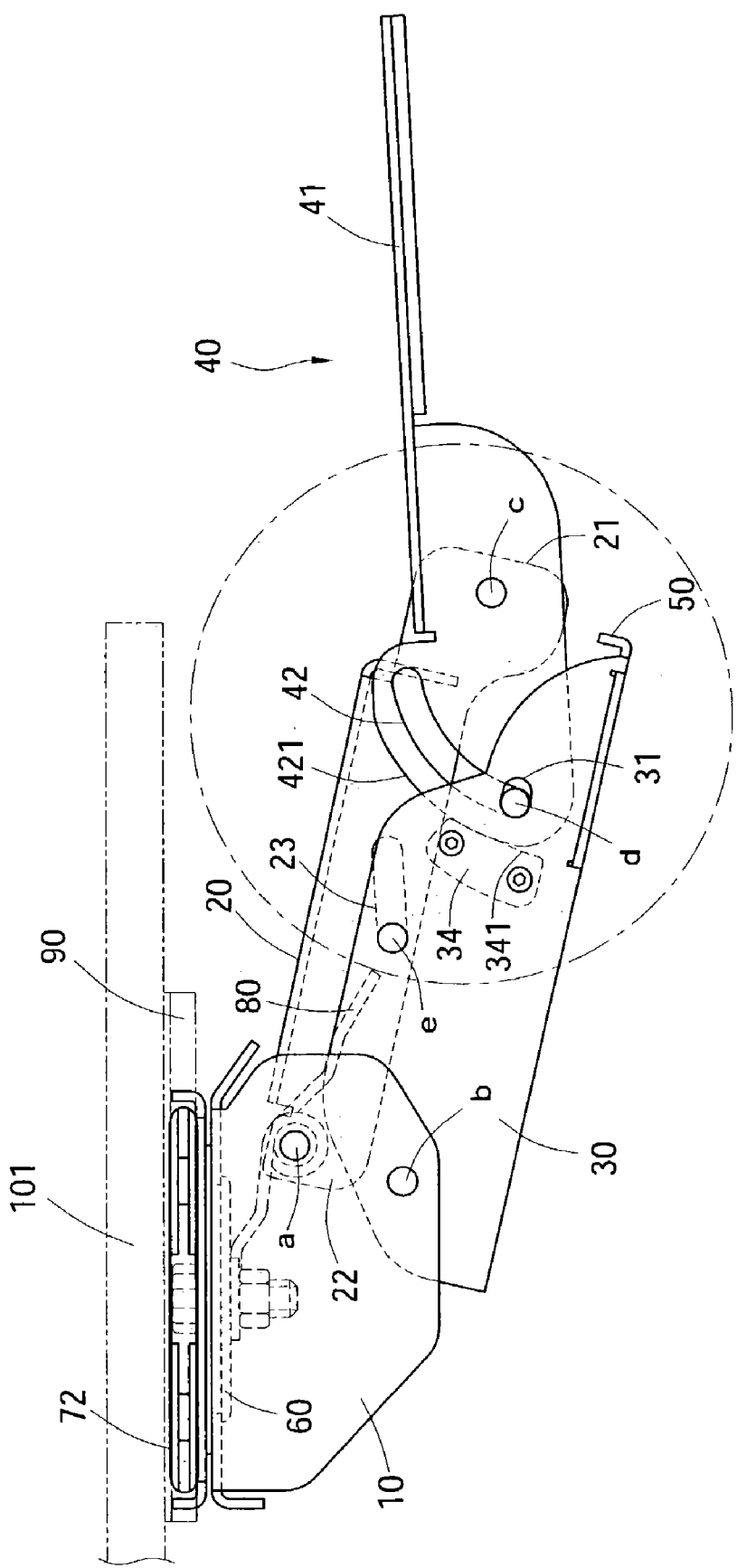
Figure 3B:
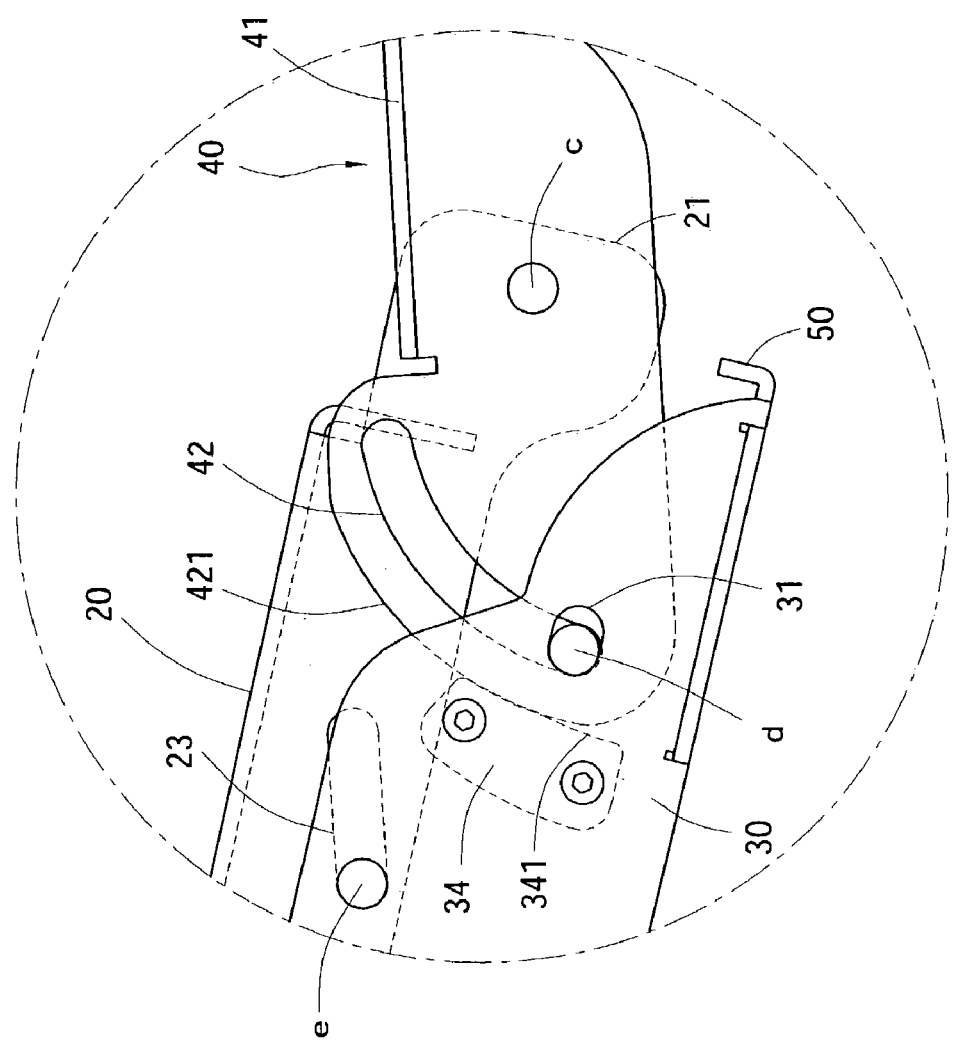
Figure 5:
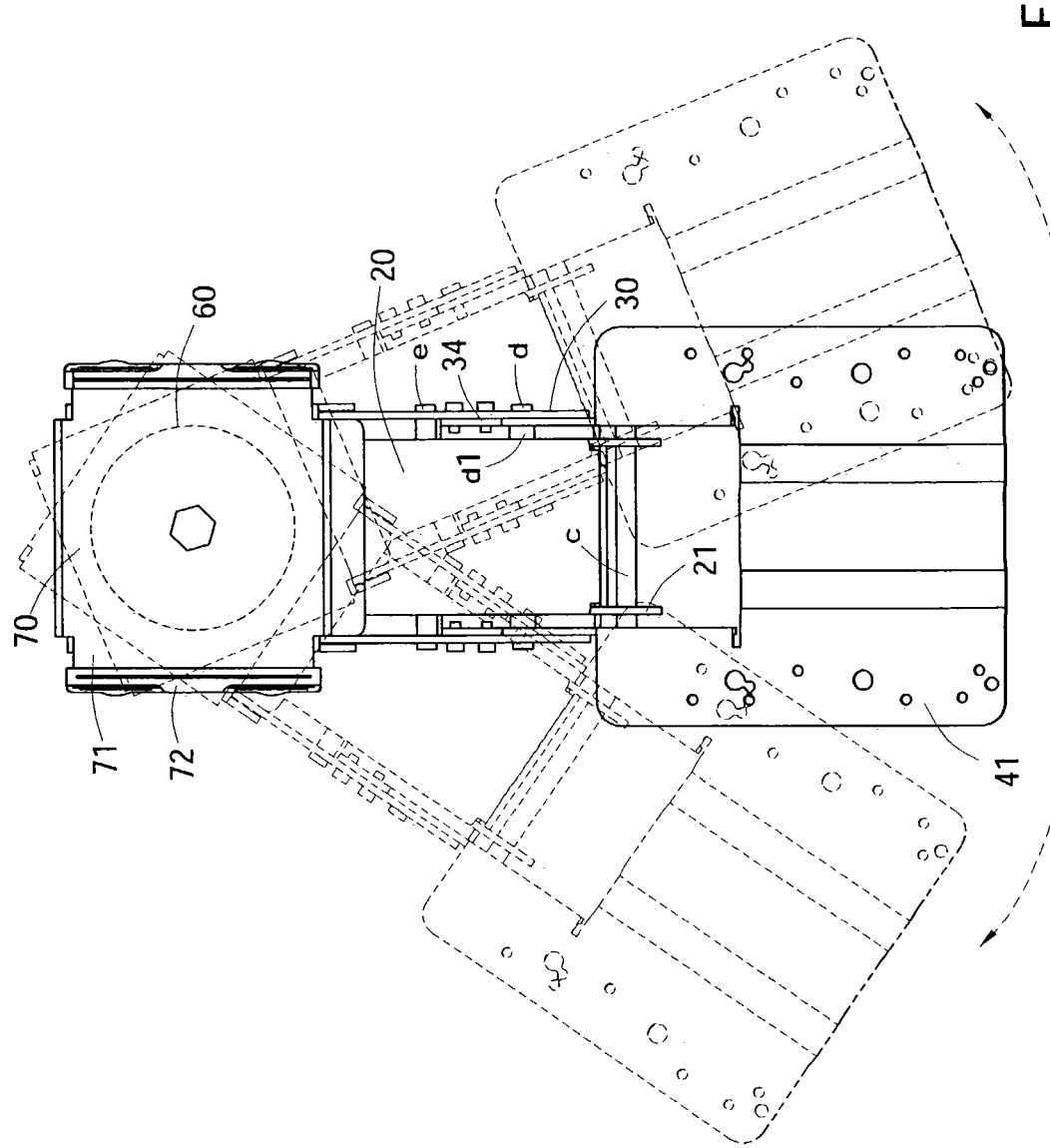
FIG. 5 is a schematic view of the present invention in various swivel adjustment conditions.

Referring to FIGS. 3A and 3B, before proceeding vertical displacement adjustment, the sliding rail 72 on the two side flanges 71 of the sliding track 70 is coupled on the track plate 90 to move horizontally relative to the desktop 101 (i.e. the entire keyboard may be moved outwards or inwards through the support bracket to user's operating position). When the horizontal movement and adjustment is finished, as shown in FIG. 5, a leftward or rightward swivel adjustment relative to the sliding track 70 may be made through the rotary disk 60 on the swivel zone 13 of the mounting bracket 10. Of course, the horizontal adjustment and swivel adjustment may also be done after the vertical adjustment is finished.

Figure 3C:
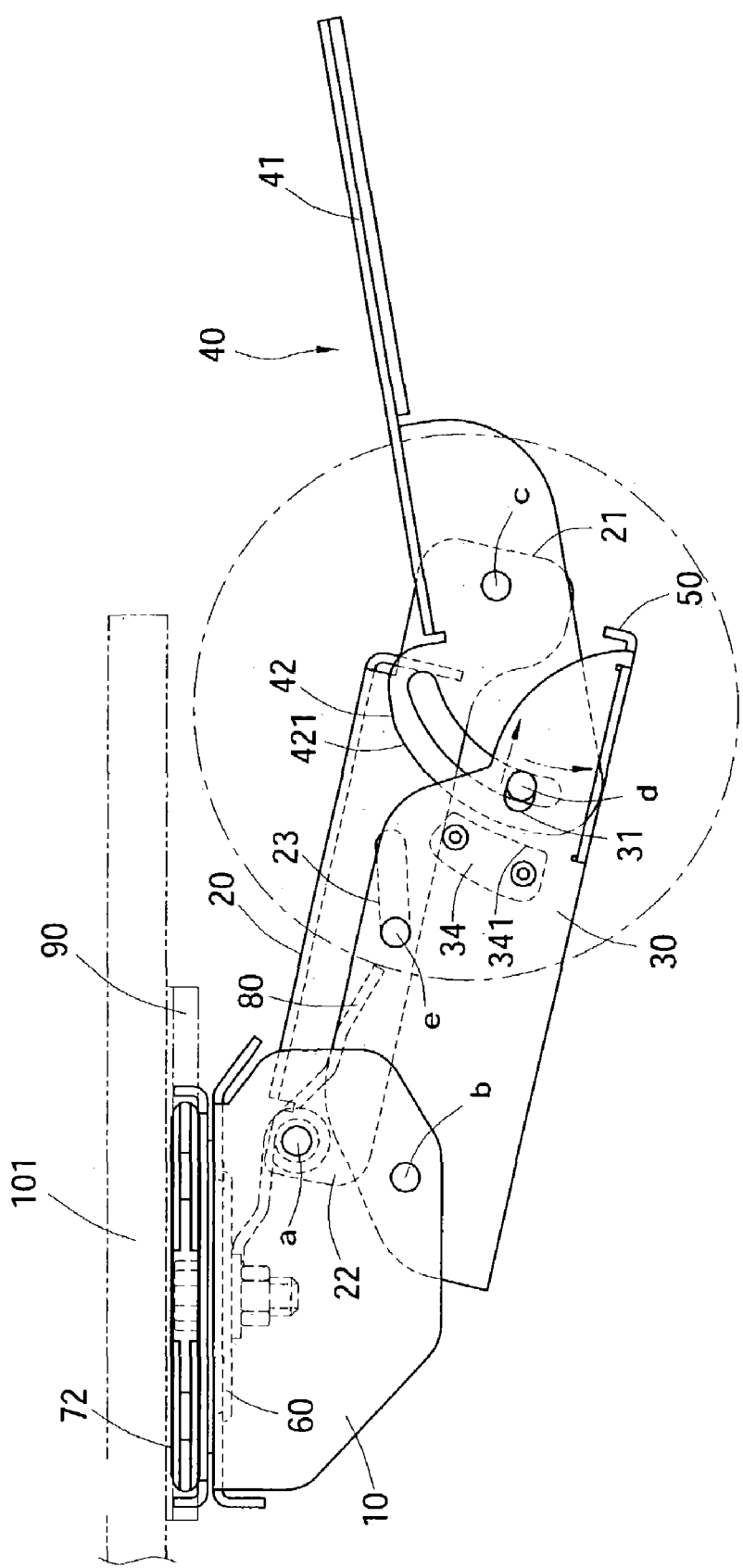
Figure 3D:
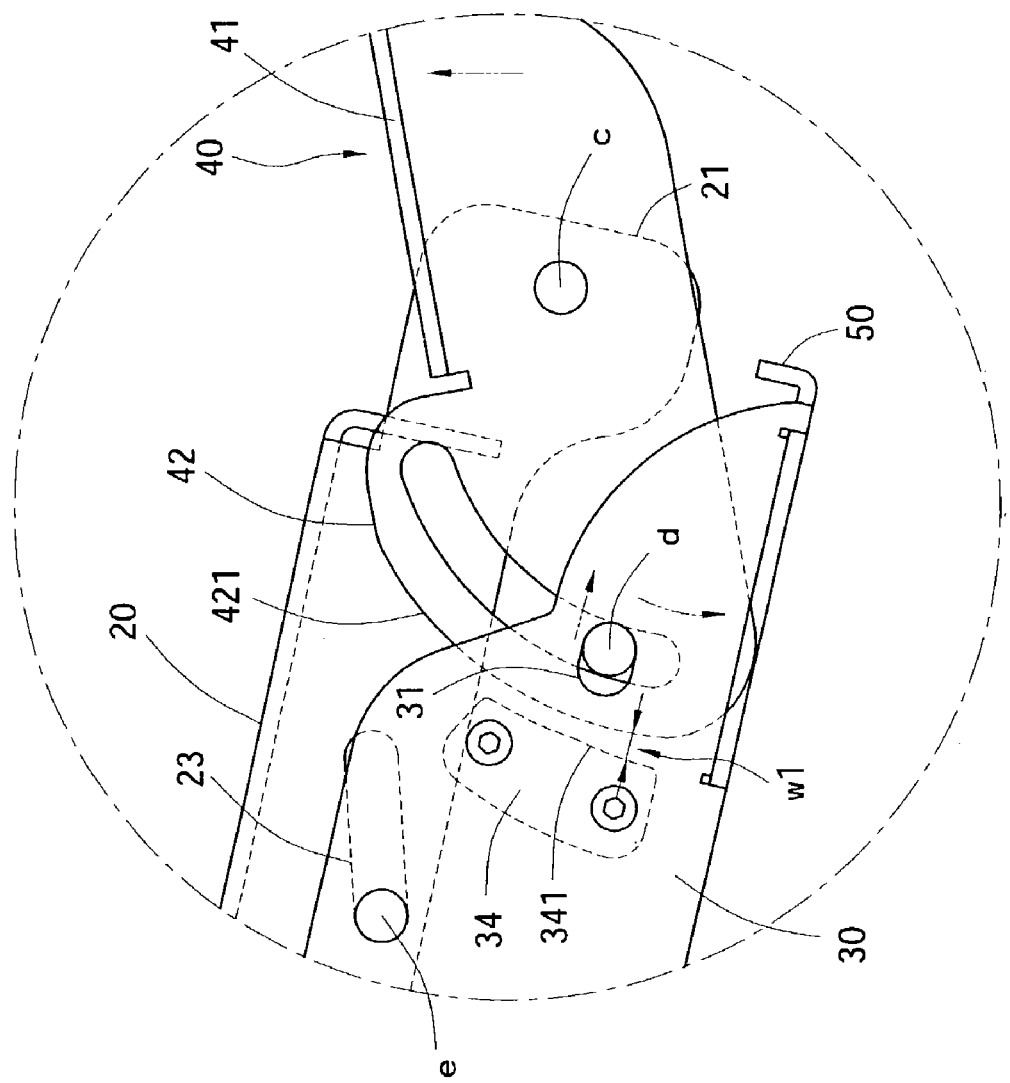

The vertical adjustment procedures of the invention can be divided as follows:

1. As shown in FIGS. 3A and 3B, the side arm 30 is closed to the highest position of the desktop 101. It is to be noted that the harness side 421 of the holding bracket 40 has its lower section forming a bucking relationship with the brake side 341. Referring to FIGS. 3C and 3D, when a force is applied to move the holding bracket 40 upwards, the fourth axle d is pivotally engaged in a movable manner. Thus when the holding bracket 40 is moved upwards, the fourth axle d is moved upwards in the displacement slot 42, and is moved along an arched adjustment track of the displacement slot 42 and meanwhile the fourth axle d is pushed towards the direction of the holding bracket 40 in the adjusting hole 31 (with the adjusting hole 31 substantially normal to the displacement slot 42). With the fourth axle d moved closed to the adjusting hole 31 of the holding bracket 40, the harness side 421 of the holding bracket 40 is separated from the brake side 341 to release the bucking condition. The corresponding friction force is absent in such a condition.

Figure 3E:
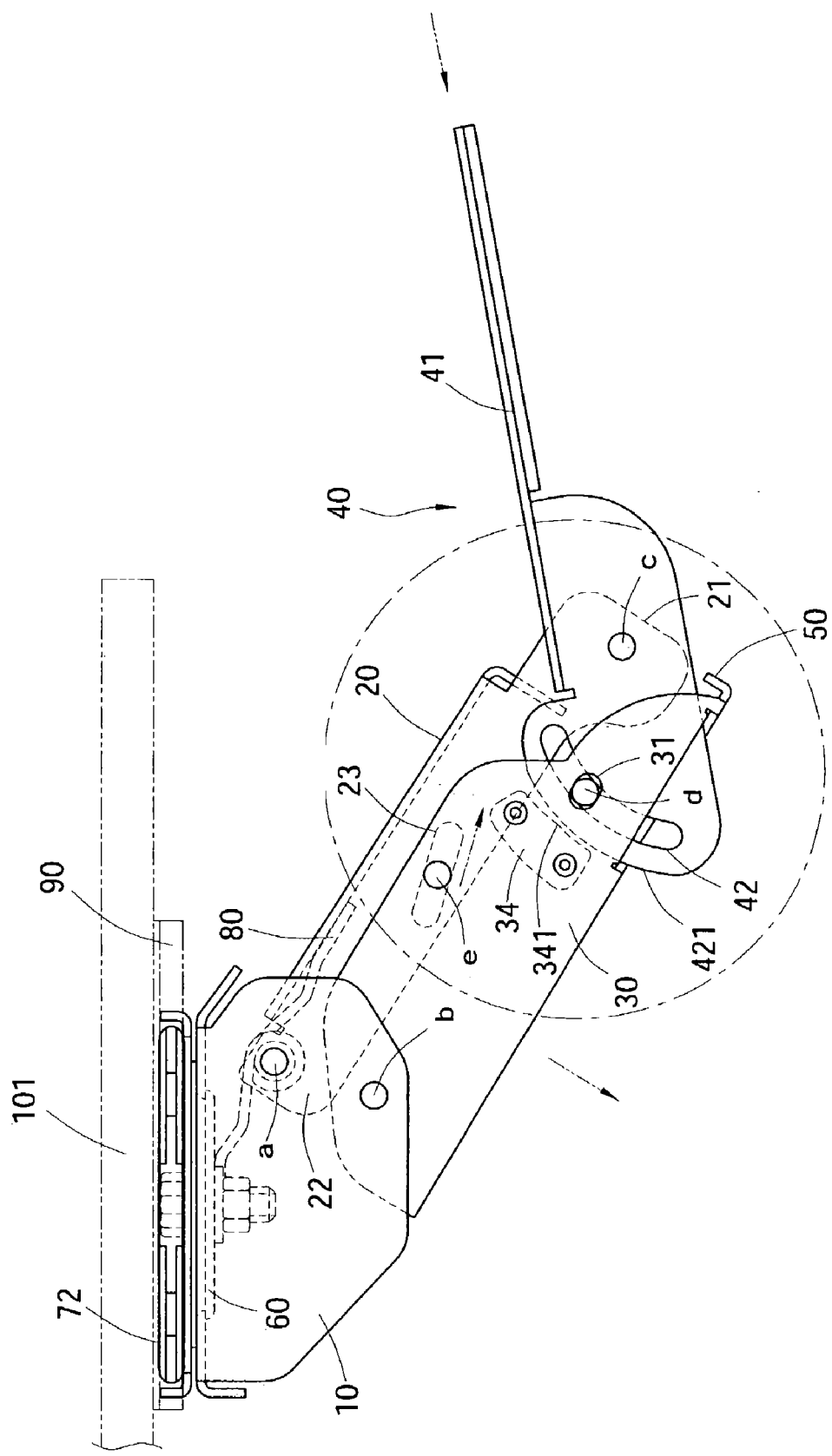
Figure 3F:
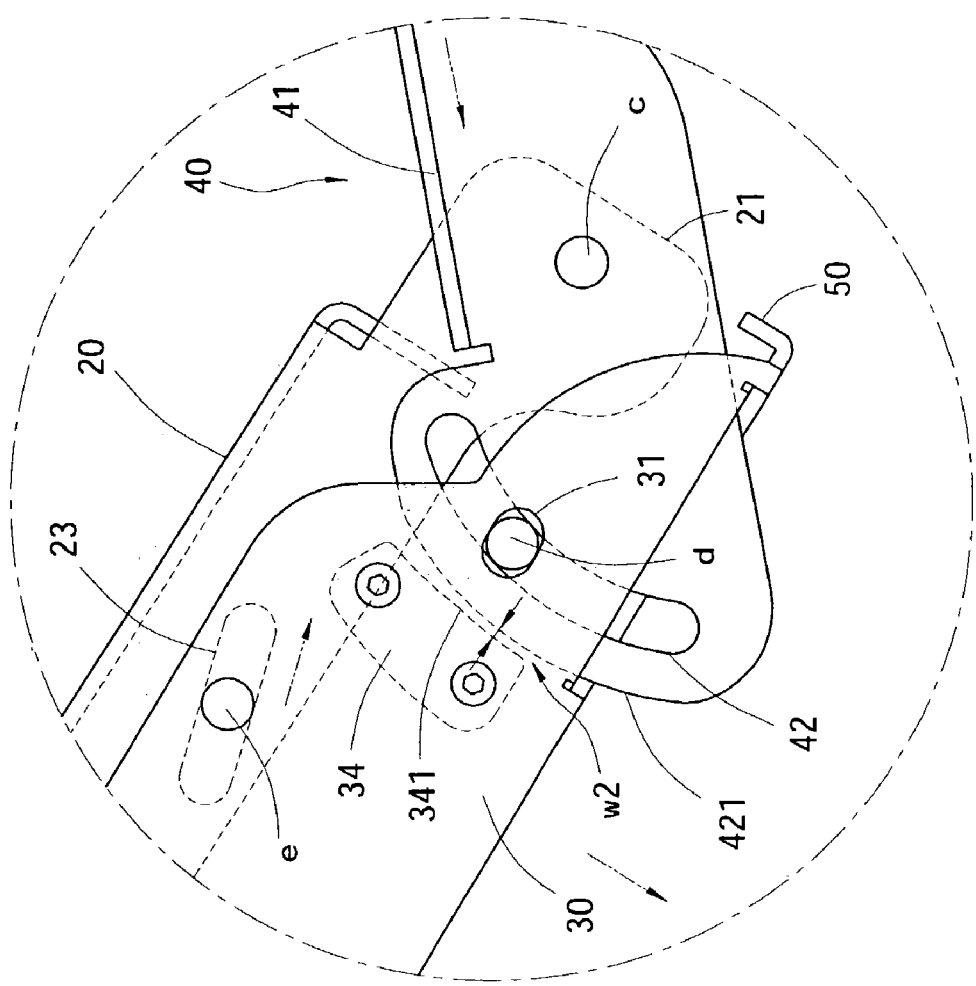
Figure 3G:
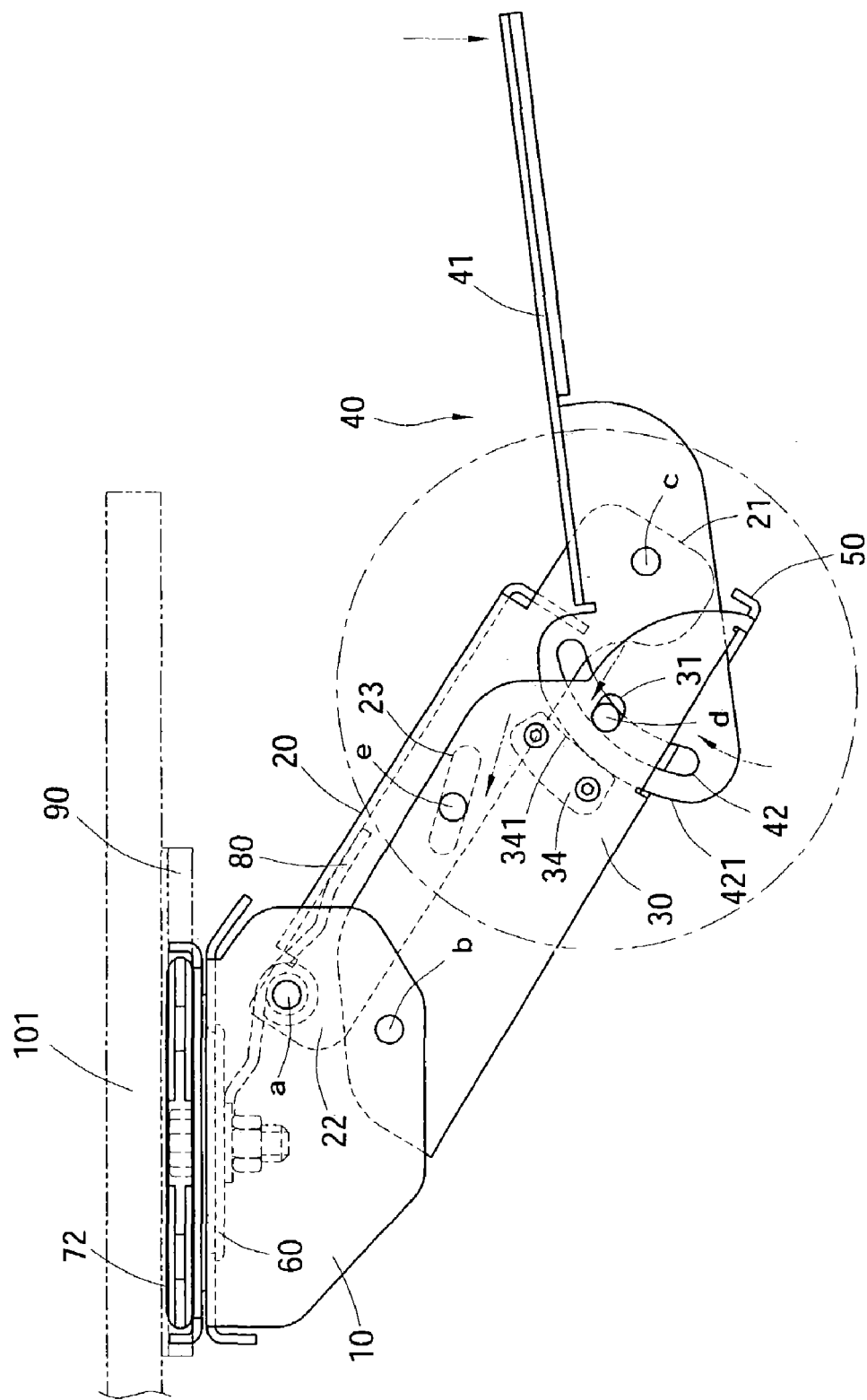
Figure 3H:
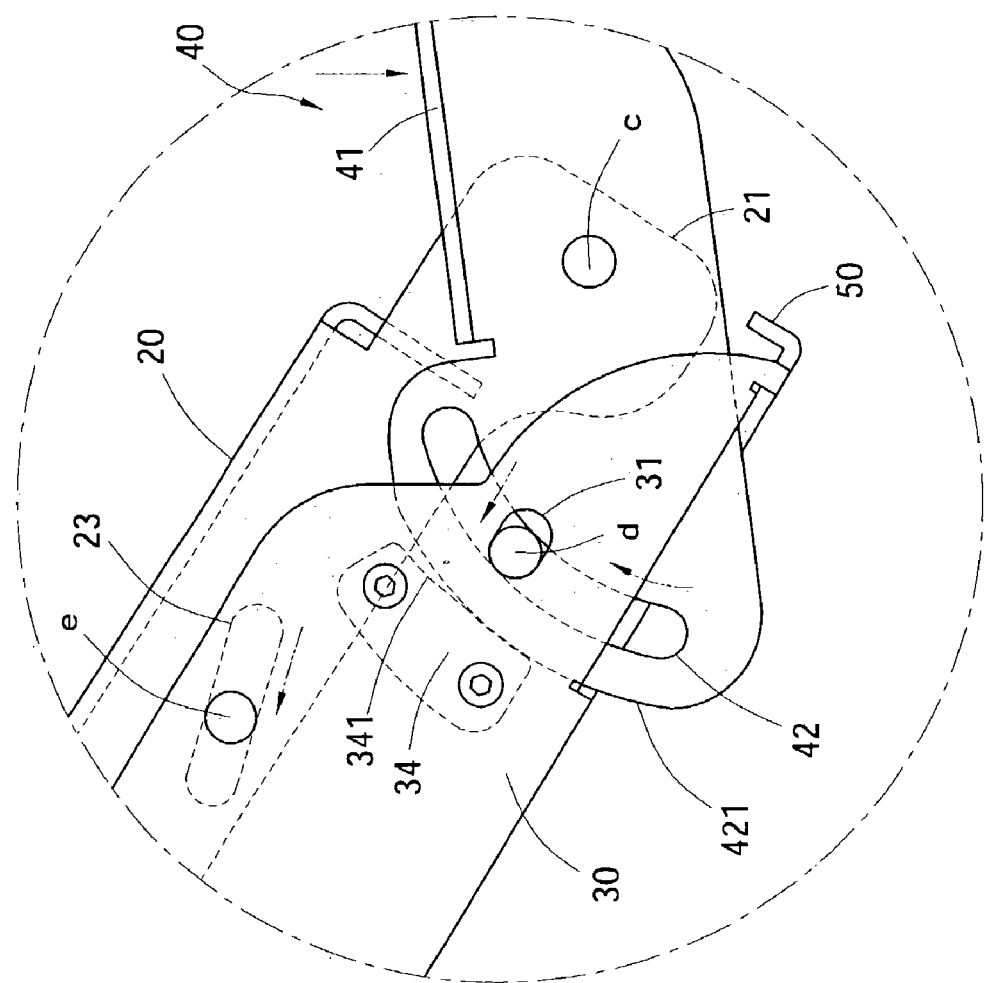
Figure 31:
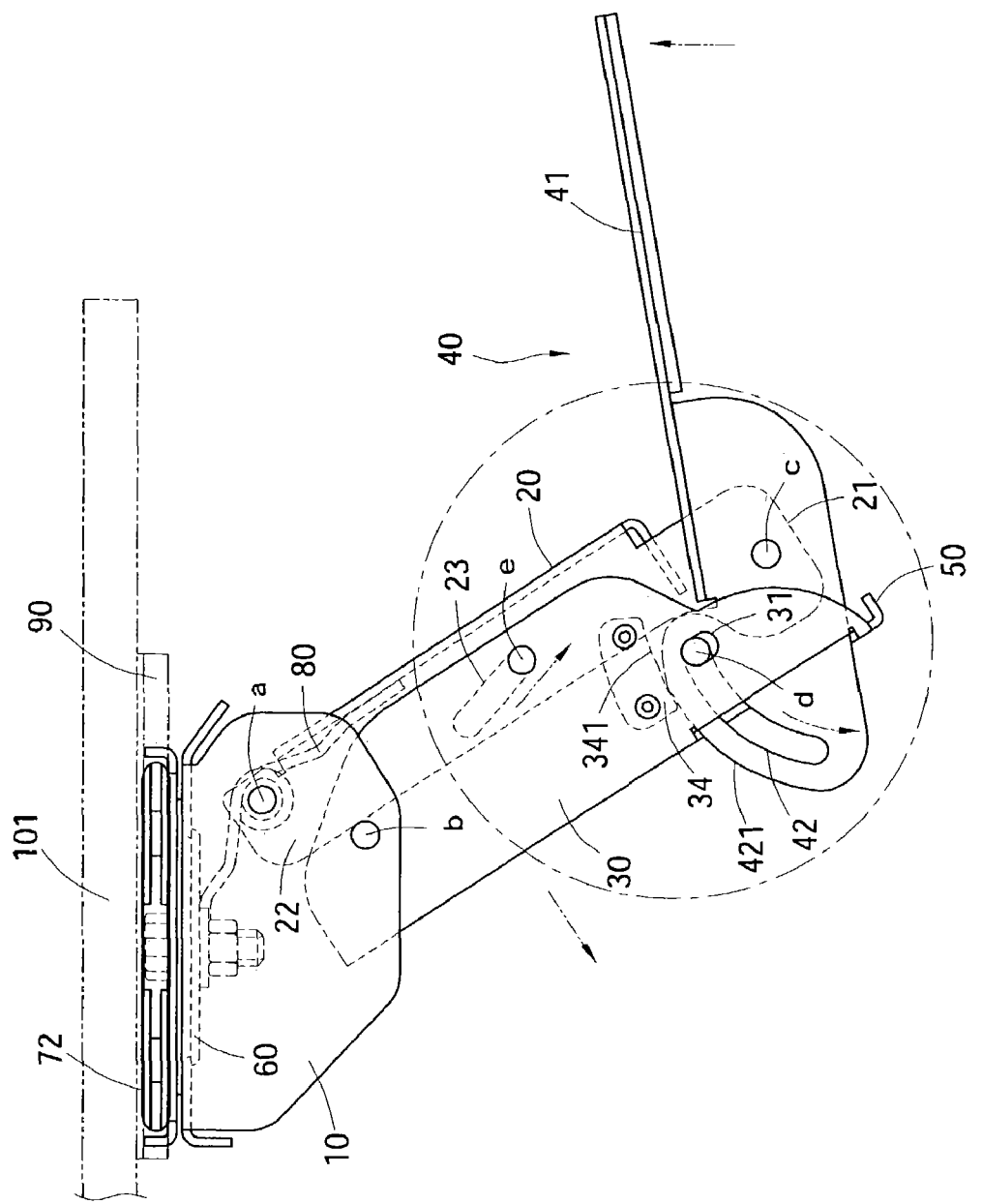
Figure 3J:
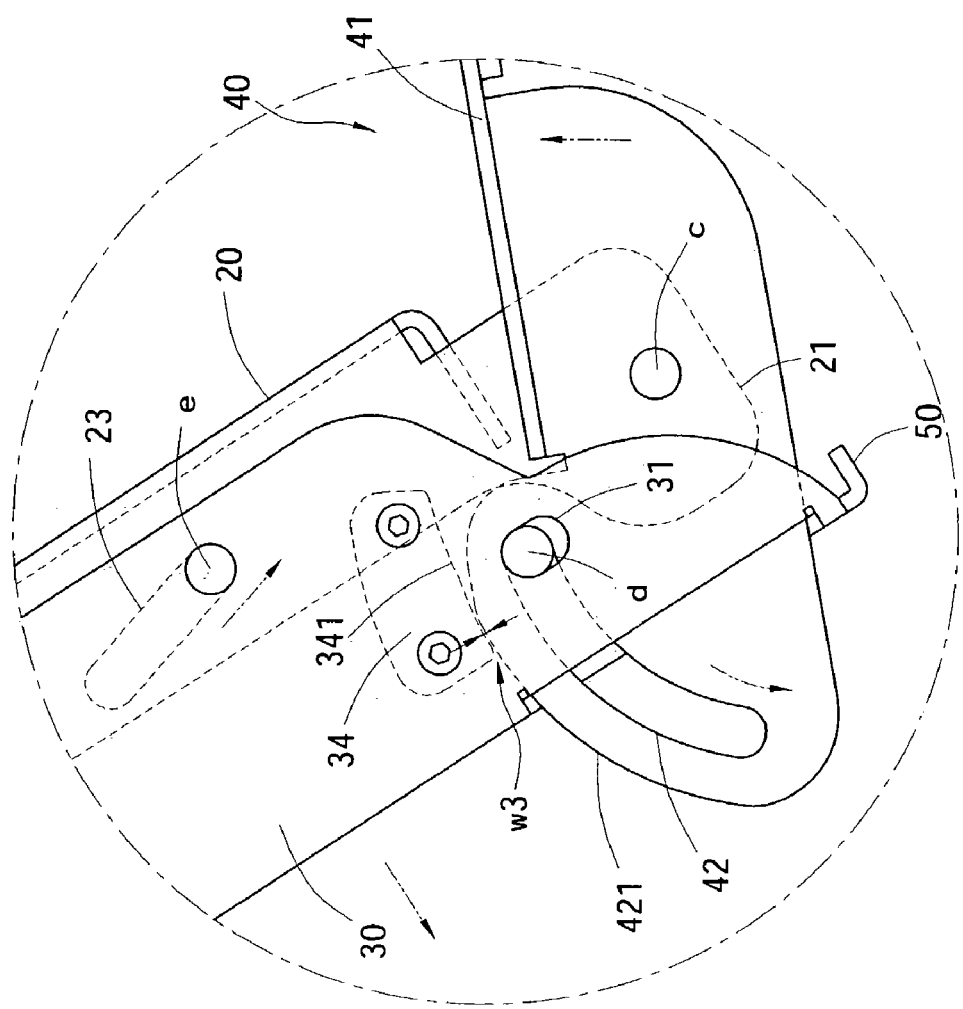

2. Because the friction force is absent, user can easily move the holding bracket 40, through the third axle c to move the upper arm 20, then use the first axle a and the second axle b as fulcrums to move vertically in an endless manner to the middle position as shown in FIGS. 3E and 3F; or move to the bottom as shown in FIGS. 3I and 3J. It is to be noted that the harness side 421 and the adjustment track of the displacement slot 42 have the curvature of the same shape. And the brake side 341 also has a selected concave surface. Thus in the vertical movement, the gap between the harness side 421 and the brake side 341 becomes smaller gradually. Therefore, adjustment range is limited to prevent the harness side 421 from exceeding the adjustment range and resulting in ineffective positioning.

Figure 3K:
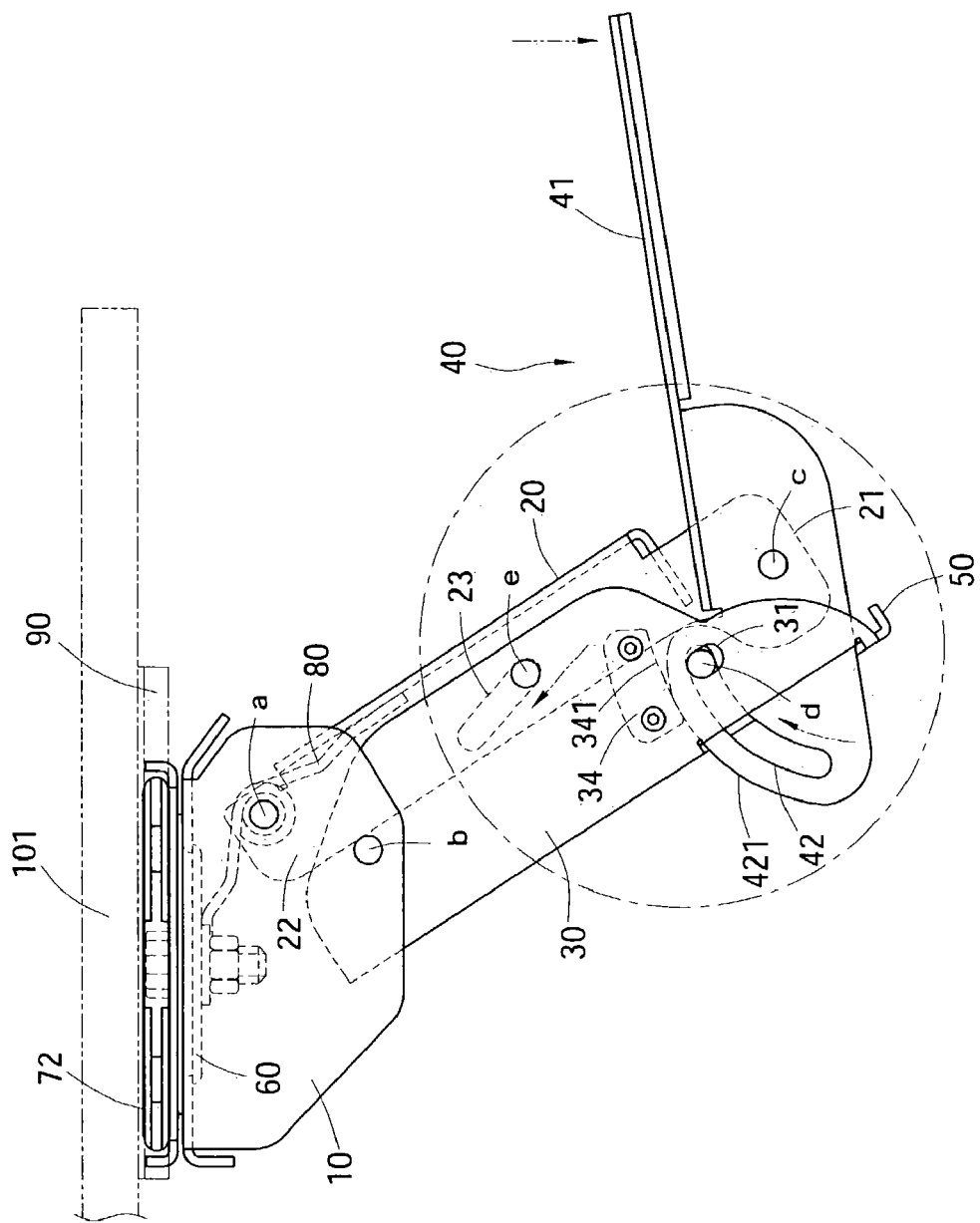
Figure 3L:
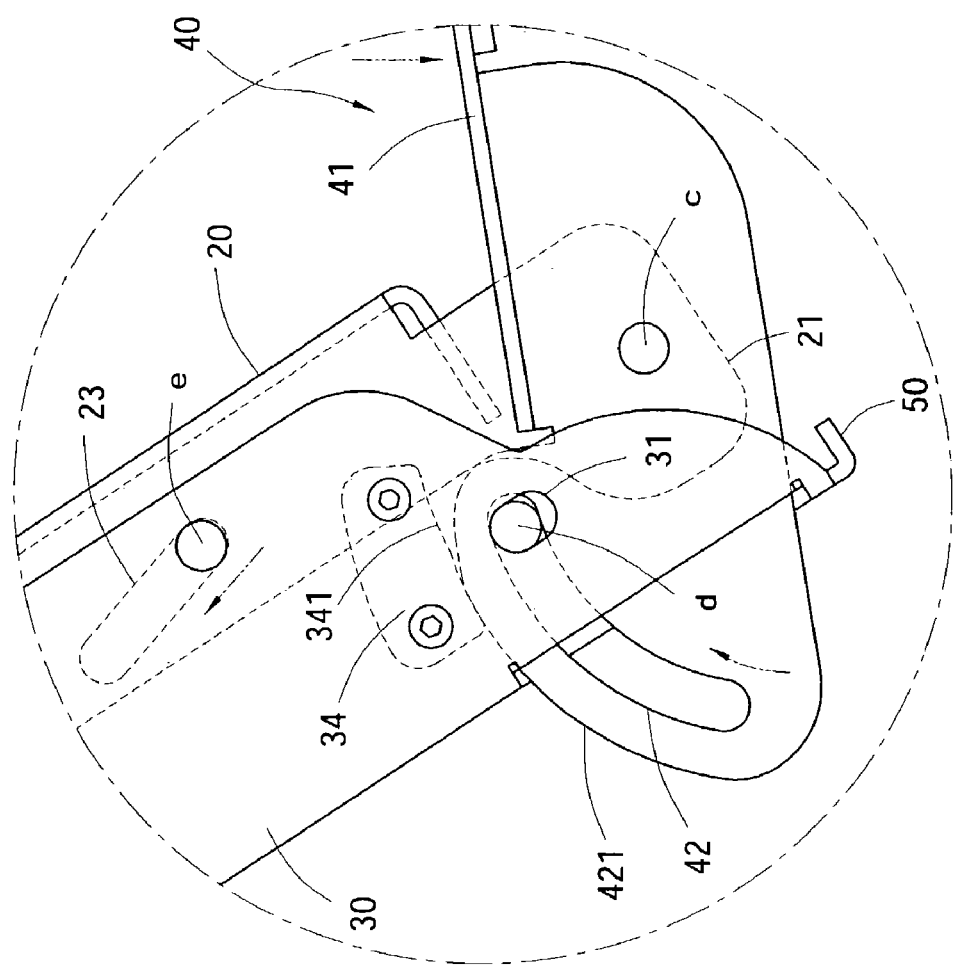

3. After a desired vertical position has been adjusted to suit the user, the force on the holding bracket 40 may be released to move the holding bracket 40 downwards to the horizontal position. The adjustment track of the displacement slot 42 can synchronously push the fourth axle d in the adjusting hole 31 towards the direction of the brake element 34. Meanwhile, the harness side 421 of the holding bracket 40 is in contact with the brake side 341. The arched sides generate friction force to press each other and form an anchoring effect. This step is shown in FIGS. 3G and 3H. When the position of the side arm 30 moves away from the middle portion of the desktop 101, the harness side 421 of the holding bracket 40 has its middle portion bucking against the brake side 341. Referring to FIGS. 3K and 3L, when the side arm 30 is moved away from the lowest position of the desktop 101, the harness side 421 of the holding bracket 40 has its upper portion bucking against the brake side 341 to form a latching relationship.

Figure 6:
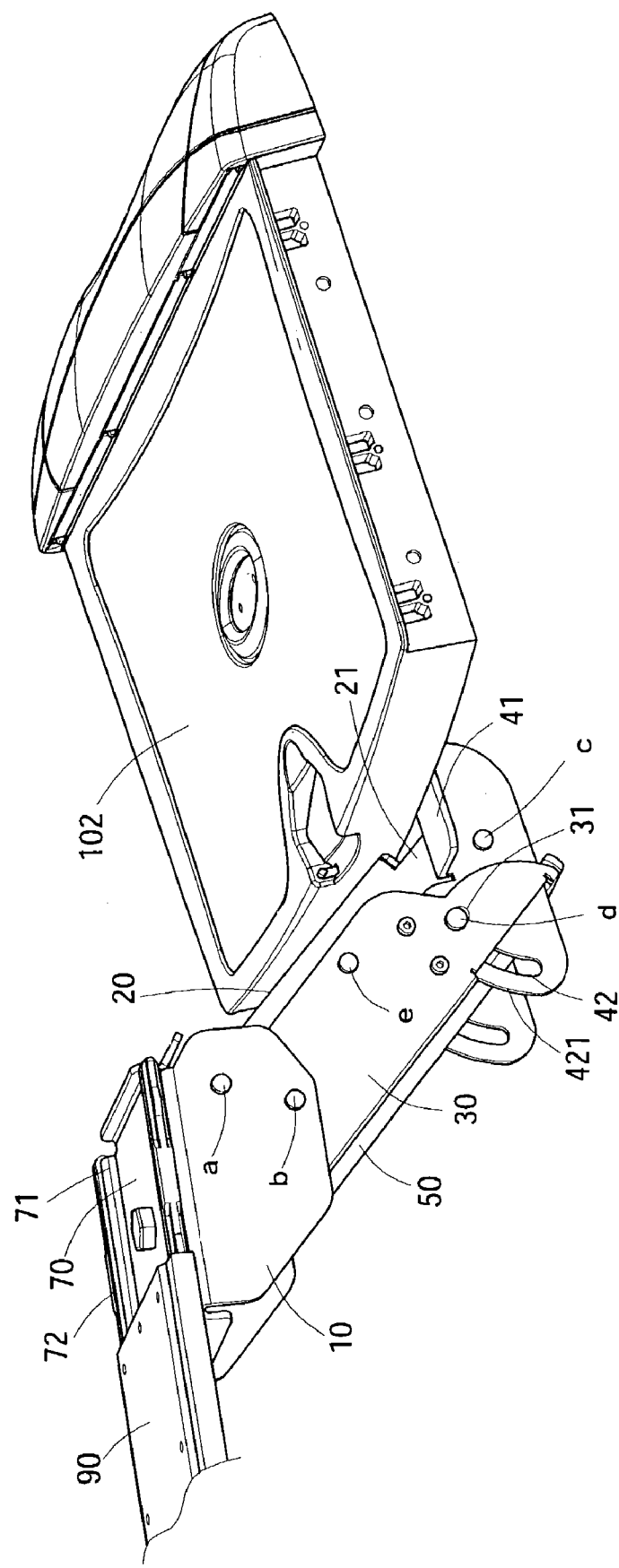
FIG. 6 is a schematic view of an embodiment of the present invention.

4. Referring to FIG. 6, the holding bracket 40 includes a holding board 41 to fasten to a holding seat 102. The holding seat 102, in addition to holding a keyboard, may also hold other peripheral devices such as a mouse (not shown in the drawing). After having completed the horizontal, swivel and vertical adjustment, the holding seat 102 of the holding bracket 40 is substantially in parallel with the desktop 101 and becomes horizontal to hold the keyboard. Thus it can be adjusted to a desired position to suit user's sitting posture and hand position.

During the operations set forth above, the side arm 30 and the holding bracket 40 have angular alterations relative to the desktop 101. Details of those angular alterations are depicted below. When the holding bracket 40 is lifted by forces and the harness side 421 is separated from the brake side 341 in a non-contact condition, as the adjustment track of the displacement slot 42 is curved, and if the gap between the harness side 421 and the brake side 341 is w1 after separated when the side arm 30 is closest to the desktop 101 (referring to 3D), and the gap is w2 when the side arm 30 is moved downwards to a medium location from desktop 101 (referring to FIG. 3F), and the gap is w3 when the side arm 30 is moved downwards to a lowest location from desktop 101 (referring to FIG. 3J), the relationship of the gaps is w1>w1>w3. Through the bucking arched sides of the brake side 341 and the harness side 421, the holding bracket 40 may form various inclined angles relative to the desktop 101.

Figure 4A:
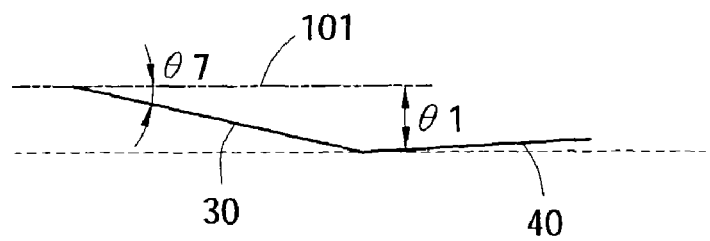
FIGS. 4A through 4F are schematic views of the present invention showing the angular relationship between the side arm and the holding bracket.
Figure 4B:
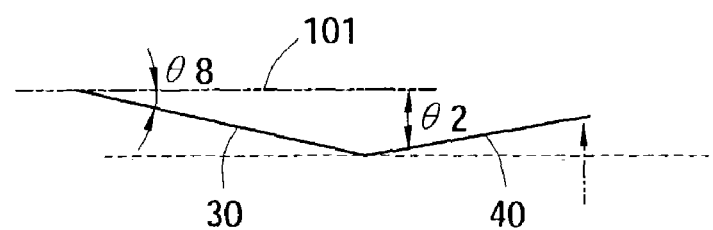

In the following discussion, in order to facilitate explanation of the related positions, the lowering of the horizontal line of the desktop 101 is shown by an imaginative broken line, and the angles are the included angles relative to the desktop 101, not the variations of included angle of the holding bracket 40 relative to the side arm 30. First, refer to the variations of the gap between the holding bracket 40 and the side arm 30 discussed previously. Referring to FIG. 4A, the holding bracket 40 may have a preset inclined angle è1 (about 3 degrees), the included angle of the side arm 30 relative to the desktop 101 is è7. The angles è1 and è7 indicate that the side arm 30 is closed to the highest position of the desktop 101 as shown in FIG. 3A. When the holding bracket 40 is lifted to a position as shown in FIG. 3C, the angular variations are shown in FIG. 4B, with the inclined angle of the holding bracket 40 relative to the desktop 101 increased to è2 (about 10 degrees). In this condition, the position of the side arm 30 does not change, thus the angle relative to the desktop 101 is è8=è7.

Figure 4C:
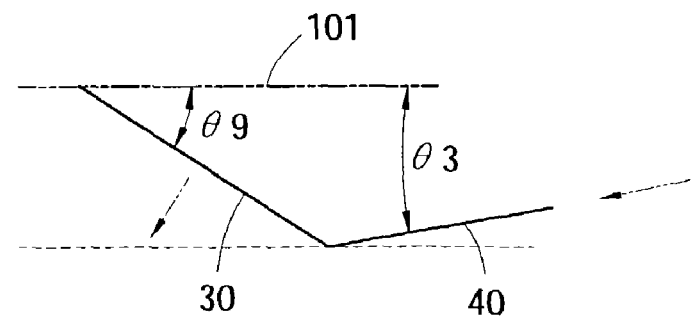
Figure 4D:
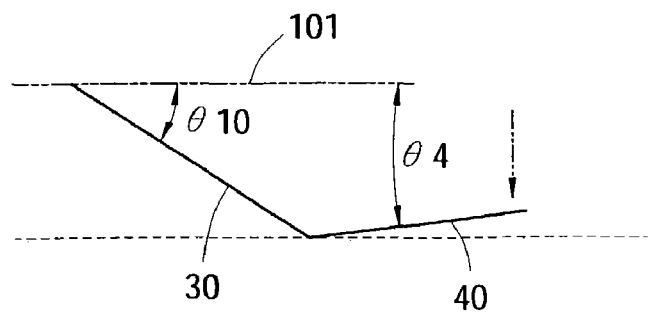
Figure 4E:
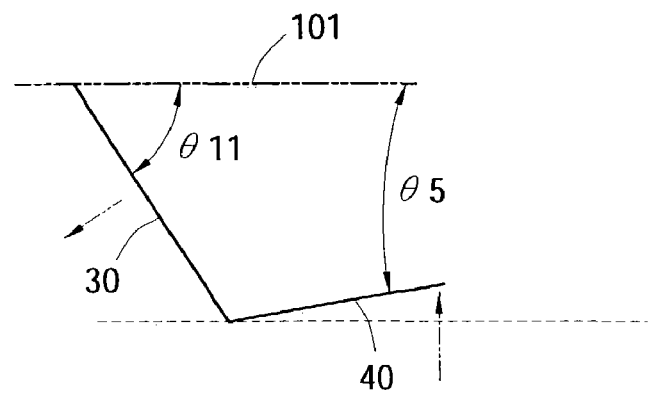
Figure 4F:
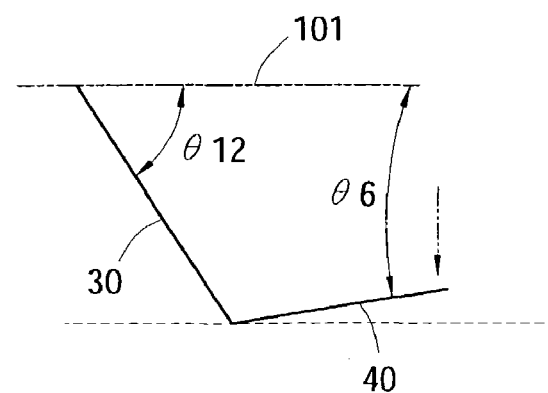

When the holding bracket 40 is moved vertically downwards to a middle position as shown in FIG. 3E, the included angle è9 between the side arm 30 and the desktop 101 increases as shown in FIG. 4C. As the force applied on the holding bracket 40 is not yet released, the angle è3 relative to the desktop 101 remains unchanged, i.e. è3=è2.

When the force applied on the holding bracket 40 is released as shown in FIG. 3G, and the holding bracket 40 is anchored at the middle position, the included angle of the side arm 30 relative to desktop 101 remains unchanged, i.e. è10= è9. But due the gap is eliminated, the included angle of the holding bracket 40 relative to the desktop 101 decreases slightly to become è4 which is smaller than è3 (about 7 degrees), But è4 is still greater than è1. Namely, the included angle of the holding bracket 40 relative to the desktop 101 is greater than the inclined angle.

Referring to FIG. 3L, when the holding bracket 40 is moved vertically to the lowest position without releasing the force, the included angle è11 between the side arm 30 and the desktop 101 is maximum. Due to the force on the holding bracket 40 is not yet released, its angle relative to the desktop 101 e5 remains unchanged, i.e. è5=è3=è2.

Referring to FIG. 3K, when the force on the holding bracket 40 is released and the holding bracket 40 is moved to the lowest position, the relative included angle between side arm 30 and the desktop 101 remains unchanged, i.e. è12=è11. But due the gap has been eliminated, the included angle of the holding bracket 40 relative to the desktop 101 decreases, i.e. è5<è6 (about 9 degrees). However, è6 is still greater than è4 and è1. Namely, the inclined angle of the holding bracket 40 relative to the desktop 101 has changed to the maximum.

Based on previous discussions, the angular relationship can be summed up as follows: the included angle relative to the desktop 101 is è1 when the holding bracket 40 is located at the highest position, è4 when the holding bracket 40 is located at the middle position, and è6 when the holding bracket 40 is located at the lowest position, and è6>è4>è1. Thus the inclined angle of holding bracket 40 increases as the operation position of the holding bracket 40 lowers. Therefore it conforms to ergonomics and enables the forearms of users to form the same inclination (relative to the vertical angle of human body), thereby to get effective support and can prevent injury that might otherwise happen when operating at the same posture for a long period of time.

In summary, compared with U.S. Pat. No. 5,924,664, the invention offers features and advantages as follows:

1. The invention permits vertical adjustment after the frictional anchoring between the harness side 421 and the brake side 341 has been released. During adjustment, there is no limitation of friction forces, thus adjustment may be made with less efforts, and no metal friction sound occurs, and noise may be prevented.
2. In the invention, the anchor fulcrum is located between the holding bracket 40 and the side arm 30, and the frictional force borne by the brake element 34 is merely the weight of the holding bracket 40 and the keyboard. It requires a smaller frictional force. Thus the invention can achieve an effective anchoring at every position when doing the endless adjustment. By contrast, the stopping means in U.S. Pat. No. 5,924,664 has to bear the weight of the side arm 30, upper arm 20, lower arm 50, holding bracket 40 and keyboard. The moment of force is greater, and required frictional force also is greater, and damage is prone to occur.
3. The angle of the holding bracket 40 relative to the desktop 101 is not constant. The inclined angle of the holding bracket 40 changes as the angle of the side arm 30 increases. Thus it better conforms to ergonomics.

What is claimed is:

1. A keyboard support bracket structure fastened to a underside of a desktop movable horizontally and vertically relative to the desktop to a desired position for keyboard operation, comprising:
   a mounting bracket fastening to the desktop;
   an upper arm pivotally engaged with the mounting bracket through a first axle;
   a side arm pivotally coupled on two sides of the mounting bracket through a second axle; and
   a holding bracket pivotally engaged with the upper arm through a third axle and pivotally engaged with the side arm through a fourth axle;
   wherein the first, second and third axles are pivotally engaged on fixed locations to form a linkage movement, the side arm having an adjusting hole formed on the pivotal connection location for the fourth axle that has a transverse width greater than the outer diameter of the fourth axle, and a brake element which has a brake side facing the holding bracket, the holding bracket having an arched displacement slot corresponding to the adjusting hole that has an adjustment track, the displacement slot having an outer side to form a harness side corresponding to and bucking against the brake side of the brake element such that when holding bracket is moved upwards the fourth axle is moved in the displacement slot along the adjustment track in the adjusting hole towards the direction of the holding bracket and drives the holding bracket to move outwards to separate the harness side from the brake side so that the holding bracket is movable vertically by a force through the first, second and third axles.

2. The keyboard support bracket structure of claim 1, wherein the adjusting hole is normal to the displacement slot.

3. The keyboard support bracket structure of claim 1, wherein the harness side and the adjustment track of the displacement slot have a same curvature.

4. The keyboard support bracket structure of claim 1, wherein the upper arm has a transverse slot formed in a middle section to couple with a fifth axle to pivotally engage with the side arm and the upper arm.

5. The keyboard support bracket structure of claim 1, wherein the side arm houses a sleeve which has an outer diameter greater than the fourth axle and the height of the adjusting hole.

6. The keyboard support bracket structure of claim 1, wherein the upper arm has a front end and a rear end extending respectively to form a front flap and a rear flap that have respectively a pivot hole to pivotally couple with the first axle and the third axle.

7. The keyboard support bracket structure of claim 1, wherein the side arm has a bottom to form a lower arm.

8. The keyboard support bracket structure of claim 1, wherein the first axle is coupled with an elastic restoring element.

9. The keyboard support bracket structure of claim 1, wherein the desktop has a lower side fastening to a track plate, the mounting bracket having a sliding track dock fastened thereon, the sliding track dock having two side flanges fastening to a sliding rail which is movable horizontally on the track plate.

10. The keyboard support bracket structure of claim 9, wherein the mounting bracket has a swivel zone which holds a rotary disk between the rotary zone and the sliding track dock.

11. A keyboard support bracket structure fastened to a underside of a desktop movable horizontally and vertically relative to the desktop to a desired position for keyboard operation, comprising:

a mounting bracket fastening to the desktop;

an upper arm pivotally engaged with the mounting bracket through a first axle;

a side arm pivotally coupled on two sides of the mounting bracket through a second axle; and a holding bracket pivotally engaged with the upper arm through a third axle and pivotally engaged with the side arm through a fourth axle;

wherein the first, second and third axles are pivotally engaged on fixed locations to form a linkage movement, the side arm having an adjusting hole formed on the pivotal connection location for the fourth axle that has a transverse width greater than the outer diameter of the fourth axle, and a brake element which has a brake side facing the holding bracket, the holding bracket having an arched displacement slot corresponding to the adjusting hole that has an adjustment track, the displacement slot having an outer side to form a harness side corresponding to and bucking against the brake side of the brake element;

wherein the brake side bucks against the harness side in such a manner that the side arm is movable from closed to a highest position of the desktop to a lowest position of the desktop with an increasing angle and the holding bracket forms an increasing included angle relative to the desktop to increase inclination of the holding bracket.

12. The keyboard support bracket structure of claim 11, wherein the brake side and the harness side have respectively an arched bucking side.

* * * * *